Patented Feb. 8, 1927.

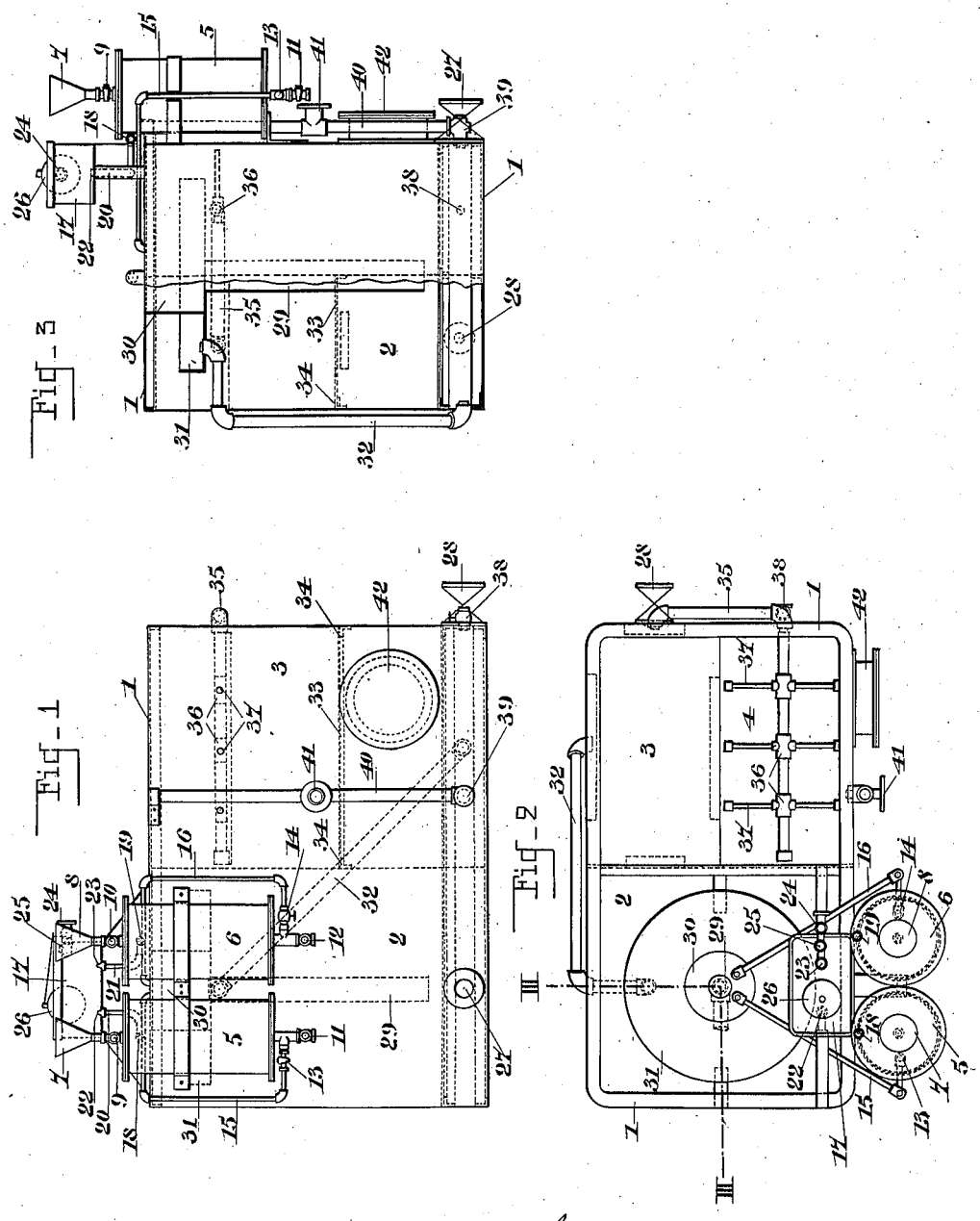

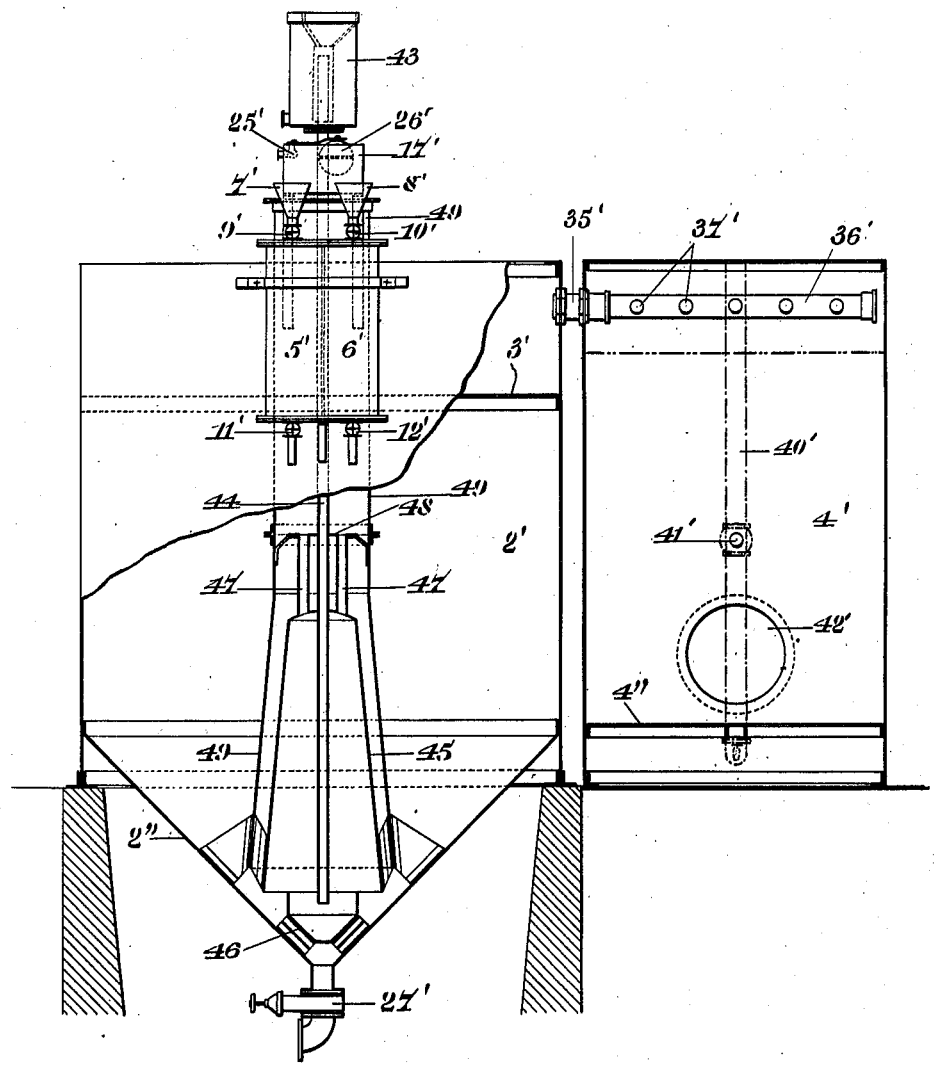

1,617,208

UNITED STATES PATENT OFFICE.

JEAN BAPTISTE GAIL AND NOËL ADAM, OF PARIS, FRANCE.

PROCESS AND APPARATUS FOR THE REMOVAL OF OIL FROM CONDENSATION WATERS.

Application filed April 11, 1921, Serial No. 460,587, and in France April 15, 1920.

This invention has for its object a process and apparatus for the removal of oil from condensation waters, the process in question comprising the application of two reagents, the one alkaline and the other acid, which, by reason of their reciprocal reaction, incorporate directly with the water a metallic hydrate very dense and extremely active, which immediately produces separation of the oil, that is to say it destroys the emulsion of the oil with the water, the aforesaid metallic hydrate carrying the oil with it in its precipitate and thus removing it.

The apparatus suitable for the carrying out of the process in question is illustrated diagrammatically in the accompanying drawing, in which:

Fig. 1 is a front elevational view of the apparatus;

Fig. 2 is a plan view of the apparatus.

Fig. 3 is a side elevational section on the line III/III of Fig. 2;

Fig. 4 is an elevation and partial section of a modification of the apparatus.

The same letters of reference indicate the same elements throughout the various figures of the drawing.

The reagents employed for producing the separation are used in the form of solutions; these solutions are mixed together, and the degree of saturation and of precipitation are determined so as to always preserve between the proportions used of these reagents, a constant relation. The reagents in question are, on the one hand, carbonate of soda, and, on the other hand, perchloride of iron. The mixture of these two products gives rise to an iron hydrate which is very active and very dense.

The reaction which takes place is given by the following equation,

$3Na_2CO_3 + Fe_2Cl_6 = Fe_2O_3 + 6NaCl + 3CO_2$.

The sesqui-oxide of iron which is formed in this reaction, is insoluble, and gives a rusty colored gelatinous precipitate which forms a lake with the small amount of lime salts which the condensation water always contains, and the resulting matter seizes the oily material.

This latter action is of a physico-chemical nature, and may form an insoluble soapy combination, with the oily matter, which breaks up the oil and water emulsion, and clarifies the water, under conditions of sufficient dilution.

The water of condensation, and even that coming from the condensation surface, is not chemically pure. It always contains a small proportion of salts, which coact with the iron hydrate, to clarify and purify the water in the above cases.

The apparatus is constructed as follows:

There is provided a reservoir 1 divided into three compartments 2, 3 and 4, and also two receptacles 5 and 6, which contain the solutions of the aforesaid reagents. The solution of perchloride of iron is contained in the receptacle 5, and the solution of carbonate of soda in the receptacle 6, or vice versa. In every case the receptacle which contains the perchloride of iron is enamelled or glazed internally, and the tubes as well as the stop cocks which connect it with the reservoir 1, are of ebonite. The receptacles 5 and 6 each contain a filling funnel 7 and 8 to which they are connected by the interposition of the stop cocks 9 and 10. At their lower parts the said receptacles are provided with stop cocks 11 and 12 for the purpose of emptying them. Other stop cocks 13 and 14 connect the receptacles, 5 and 6 through the tubes 15 and 16, with the central and upper part of the compartment 2, and the receptacles are moreover connected to a small vessel 17 containing ordinary water with the interposition of the stop cocks 18 and 19 and pipes 20 and 21. These pipes terminate inside the vessel 17 in adjustable connections 22 and 23 having orifices of equal size. These orifices must be so regulated that they will supply under the pressure corresponding to the height of the water in the vessel 17 a volume equal to the contents of the receptacle 5 or of the receptacle 6 in one day.

The arrival of ordinary water in the vessel 17 is effected by means of a cock 24 and of a valve 25 controlled by a float 26 so as to keep the level constant in the said receptacle. Consequently, the flow which takes place through the control orifices 22 and 23 remains constant, and if the level should vary in the vessel 17 the pressure upon these orifices would remain equal, which has for effect that the flow through each remains equal.

The vessel 17 is supported above the reservoir 1, and the receptacles 5 and 6 are supported adjacent the said reservoir in any convenient manner. The compartments 2, 3 and 4 possess the following particular features:

Each of these three compartments has a double perforated bottom, the perforations of which are uniformly distributed over its surface. Between the double bottoms of the compartments 2 and 3 there are placed delivery valves 27 and 28, the sections of which equal the sums of the sections of the perforations in the double bottom of the respective compartments, so as to admit of the discharge of the deposits which collect therein. The compartment 2 contains a central tube 29 surmounted on a part 30 forming one piece with a discharge tube 31, the bottom of which communicates with the double bottom of the compartment 3 by means of tubing 32. This combination is supported in any convenient manner by the walls of the compartment 2. The receptacle 3 contains a filter 33 of wood fibre supported by brackets 34 and contained between two gratings, of which the one rests upon the brackets and the other rests upon the top of the fibre. The compartments 3 and 4 are connected together by a channel 35 which is continued horizontally by means of the compartment 4 possessing a combination in the form of a cross 36, the arms 37 whereof are pierced with openings uniformly arranged, and the sum of the sections of which corresponds to the section of the channel 35. This arrangement enables distribution of the liquid throughout the compartment 4, the liquid thus distributed spreading out between the pipes 36 and 37 and the double bottom of the compartment 4.

The compartment 4 is provided with a small cock 38, which enables it to be completely emptied if desired. Another cock 39 placed in the double bottom of the compartment 4 connects to a tube 40 having its orifice at the level of the upper portion of the reservoir 1, upon which it is fixed in any convenient manner. A holder 41 is arranged at a predetermined point in the height of the tube 40 above specified.

Finally, a manhole 42 arranged upon the outer casing of the compartment 4 and formed by a cover secured by bolts and nuts, permits of cleaning out the compartment whenever necessary, without its being necessary to uncouple the various pipes.

The working of the process forming the object of the present invention by means of the apparatus above described is effected in the following manner:

The introduction of the solution of perchloride of iron is effected through 5, there first being removed therefrom a volume of liquid corresponding to that of the perchloride of iron which it is desired to introduce. This is accomplished by opening the lower cock 13 and also the cock 9 under the funnel 7 into which the solution of perchloride of iron has been poured. By operating the cock 11 some quantities are drawn off and poured back into the receptacle so as to mix the contents of the receptacle 5 and to produce in it a homogeneous solution.

With regard to the solution of carbonate of soda, it is prepared (the carbonate of soda being delivered in powder) in a certain quantity of water, and then added as with the perchloride. The water which is to have the oil removed from it is distributed in the central part of the apparatus by the pipe 30, whereas the ordinary water enters into the vessel 17 through the cock 24 and valve 9. If the cocks 18 and 19 are then opened, a little of the water contained in the vessel 17 (regulated by members 22 and 23) will pass into the vessels 5 and 6 in equal quantities, driving out by displacement through the cock 13 and the tube 15 on the one hand (for the receptacle 5) and by the cock 14 and the tube 16 on the other hand (for the receptacle 6); equal quantities of the solutions of perchloride of iron and of carbonate of soda, which mix in the vessel 31 with the water to be freed from oil. The instant reaction of the carbonate of soda with the perchloride of iron assures immediately the formation of insoluble ferric hydrate, which then acts upon the oil in the manner indicated at the beginning of this specification. This action is prolonged during the downward motion of the general mixture in the central tube 29, and at the lower part of the compartment 2 the oil has already become enclosed in a flaky, very dense precipitate. This precipitate takes shape and separates for the most part during the motion of rising up to the upper edge of the vessel 31, but it then settles back upon the double bottom of the compartment 2.

The tube 32 conducts the liquid to the lower part of the compartment 3 where it still contains some traces of precipitate. This liquid is then obliged to travel up through the filter 33 of woody fibre before it can escape through the tube 35. During the passage of the liquid through the filter 33 the remaining precipitate is retained by this filter, and the last traces thereof which might still remain in the liquid are caught by a filter in the compartment 4, above which the water flows through the orifices of the branches 37 of the tube 36. Assuming that the outlet of the purified water is effected through the pipe 40 and outlet 41, it results that there will always remain in the last said filter a certain quantity of liquid. The filter therefore operates by the trickling of the liquid through the upper part and by ordinary filtration in the lower part thereof, where it is under water. The changing of the filter is effected at long intervals, and the material taken out can be consumed in the boiler. With regard to the emptying by means of the outlet valves 27 and 28, this should be done daily by fully opening these outlets for a few seconds.

Since the escape through the controlling members 22 and 23 is effected so that during one day the contents of the receptacles 5 and 6 have been replaced by water, it results that every day at a convenient time the preparation of the solutions should be made according to the directions given above.

In the modification of the construction illustrated in Fig. 4, the apparatus comprises a reservoir 2' in the interior of which is first effected the precipitation of the oil emulsified in the water, and then the separation of the precipitate, for which reason there is given to this receptacle the title of "demulsioner." This reservoir is provided with a tapering bottom 2" the small end of which is provided with the cock 27' for the purpose of discharging the sediments. The preparation of the reagents and their mode of use remain as already described.

The apparatus always includes for this purpose the receptacles 5' and 6' provided each of them with a filling funnel 7', 8', to which they are connected by means of the cocks 9', 10'. The lower part of these receptacles possess discharge cocks 11', 12'; the receptacles 5' and 6' are likewise continuously connected to the small vessel 17' containing ordinary water delivered through a valve 25' controlled by the float 26'. Only the arrangement of the reservoirs 5' and 6' has been slightly modified.

In the improved apparatus in question, the water to be purified from oil reaches the apparatus by passing through a siphon cistern 43 placed at the upper part of an emulsifier intended to quicken the reactions and assist the decantation. This apparatus is arranged as follows: It comprises the tube 44 through which there flows water coming from the vessel 43 whenever this latter empties itself by reason of the action of the siphon. The tube 44 continues into the interior of a bell 45, and its outlet is a little below a tapering vessel 46, the object of which will be explained further on. The bell 45 is provided at its upper part with emulsification tubes 47 discharging above a plate 48, which supports them; this plate is itself supported by a tube 49 which surrounds the bell 45 and the plate 48, leaving a free passage between it and this latter, and the tube aforesaid is prolonged to the top of the upper part of the reservoir 2'. The mixture of the two reagents and of the water which is to be purified from oil arrives through the tube 44 into the reaction bell 45, in which it is vigorously agitated at each of the actions of the siphon by the air which is imprisoned in the tube 44 after each discharge of the siphon, and which is carried away by the succeeding charge. For further explanation regarding the operation of the siphon, reference is made to applicants' copending application 460,587, and particularly Fig. 7 thereof. This vigorous agitation ensures the emulsification of the precipitates and the contact between the accumulation of precipitate already contained in the tapering vessel 45 and the precipitate in course of formation, which intensifies the reactions and quickens the decantation. The clarification of the water is effected as in the last case, by means of a filter of woody fibre, but in the present improved apparatus the filter in question is simply arranged at the upper part of the reservoir 2' so as to form the bottom of the purification compartment 3'; the precipitation of the emulsified oil in the water and the separation of the precipitate when formed are therefore very well effected in the single demulsifying reservoir 2'. At one side of this reservoir 2' is arranged a gas coke filter constructed in the same manner as already described.

The liquid escaping at the upper part of the compartment 3' enters through the channel 35' into the pipe 36' provided with cross arms 37' which distribute the liquid over the upper surface of the column of coke contained in the reservoir 4' above its double bottom 4". This latter communicates with a pipe 40' which has its exit at the level of the upper part of the reservoir 2' and comprises the part 41' fixed at any convenient height. The reservoir 4' is also provided with a manhole 42' for the purpose of removal of the coke when this is necessary. This coke acts both by direct absorption in the submerged lower part of the column, and by trickling over the surfaces of the upper part of the said column.

Having now particularly described and ascertained the nature of our said invention and in what manner the same is to be performed, we declare that what we claim is:

1. A process for removing oil from condensation water, comprising, adding to oil containing condensation water, perchloride of iron and carbonate of soda, thoroughly mixing the same therewith, and separating by gravity, the resulting precipitate and entrained oil, from the cleared condensation water.

2. Apparatus for separating oil from water, comprising, in combination, reagent tanks, a water feeding reservoir, a central tube in the reservoir having an agitating siphon, means connecting the tanks to the central tube, a reaction bell receiving the outlet end of the central tube, a casing tube surrounding the central tube and the reaction bell, emulsifying tubes placed at the upper end of the bell and communicating with the casing tube, and a decantation chamber surrounding the casing tube.

3. Apparatus for separating oil from water, comprising, in combination, reagent tanks, a water feeding reservoir, a central tube in the reservoir having an agitating siphon, means connecting the tanks to the central tube, a reaction bell receiving the outlet end of the central tube, a casing tube surrounding the central tube and the reaction bell, emulsifying tubes placed at the upper end of the bell and communicating with the casing tube, and a decantation chamber surrounding the casing tube, a double filter in communication with the above said elements, the double filter comprising, a wood fiber filter arranged to be traversed from bottom to top, by liquid from said decantation chamber, and a coke filter, a water spray feed above the coke filter, an outlet from the filter positioned intermediate the top and the bottom of the coke layer, where by the coke filter is immersed in water, up to the level of the outlet.

Dated this 30th day of March, 1921.

In testimony whereof we have signed our names.

JEAN BAPTISTE GAIL.
NOËL ADAM.